United States Patent [19]

Abrahams et al.

[11] 4,333,977
[45] Jun. 8, 1982

[54] WEAR-RESISTANT ARTICLE

[75] Inventors: Louis Abrahams, Worcester; Thomas P. J. Izod, Holliston, both of Mass.

[73] Assignee: Waters Associates, Inc., Milford, Mass.

[21] Appl. No.: 181,908

[22] Filed: Aug. 27, 1980

[51] Int. Cl.³ .................... B32B 3/10; B32B 27/00; C08K 7/02
[52] U.S. Cl. ................... 428/131; 252/12.4; 264/117; 264/127; 417/265; 417/900; 428/244; 428/422; 523/215; 524/438; 524/546
[58] Field of Search ............... 428/422, 131, 244; 264/155, 137; 277/153; 417/265, 254, 540, 900; 204/16; 252/12.2, 12.4; 260/42.17, 42.27

[56] References Cited

U.S. PATENT DOCUMENTS

| | | | |
|---|---|---|---|
| 3,152,201 | 10/1964 | Kumnick | 264/127 X |
| 3,198,188 | 8/1965 | Heid | 277/153 X |
| 3,443,817 | 5/1969 | Reiling | 277/153 |
| 3,528,955 | 9/1970 | Lippman | 526/909 X |
| 3,756,925 | 9/1973 | Takeuchi et al. | 204/16 |
| 3,804,217 | 4/1974 | Keijzer et al. | 277/153 X |
| 3,911,072 | 10/1975 | Saito et al. | 264/117 |
| 4,050,701 | 9/1977 | Webb | 277/125 |
| 4,080,233 | 3/1978 | McCloskey et al. | 264/137 X |
| 4,143,110 | 3/1979 | Morozumi et al. | 264/117 |
| 4,245,963 | 1/1981 | Hutchins et al. | 417/265 |

*Primary Examiner*—Thomas J. Herbert, Jr.
*Attorney, Agent, or Firm*—David Prashker; Paul J. Cook

[57] ABSTRACT

A wear-resistant and chemically-inert article made from a sintered mixture of polytetrafluoroethylene, graphite fibers, and fluorinated graphite.

7 Claims, 2 Drawing Figures

U.S. Patent  Jun. 8, 1982  4,333,977
FIG 1
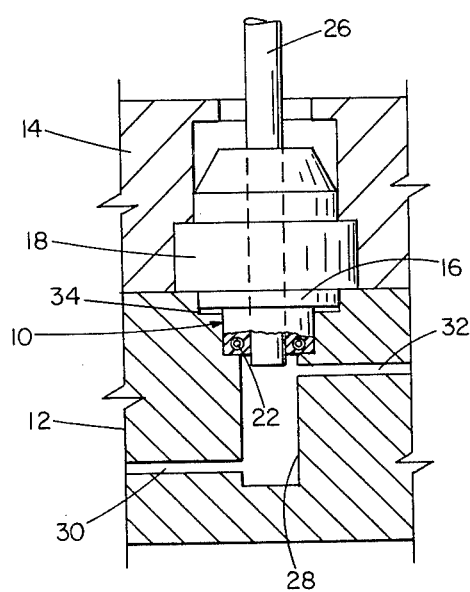
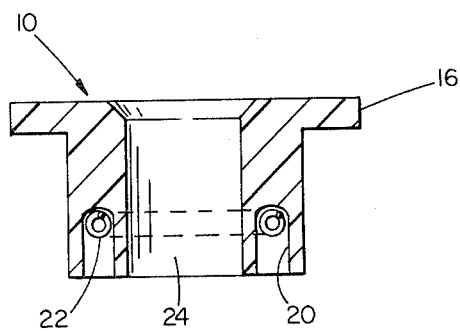
FIG 2

WEAR-RESISTANT ARTICLE

FIELD OF THE INVENTION

This invention relates to wear-resistant articles made from polytetrafluoroethylene.

BACKGROUND OF THE INVENTION

The use of polytetrafluoroethylene (PTFE) with fillers is known in the manufacture of seals, bearings, and like articles, all of which have a working surface that rubs against another surface moving relative thereto.

For example, a liquid chromatography pump manufactured by Waters Associates, Inc. (and described in copending application Ser. No. 10,686 now U.S. Pat. No. 4,245,963), currently uses a seal composed of PTFE filled with glass fibers. It is also known to make bearings from PTFE filled with fluorinated graphite.

SUMMARY OF THE INVENTION

It has been discovered that wear-resistant and chemically-inert articles can be constructed from a sintered mixture of polytetrafluoroethylene, graphite fibers, and fluorinated graphite. In preferred embodiments the mixture used is 74–84% by weight polytetrafluoroethylene, 7–17% graphite fibers, and 4–14% fluorinated graphite (most preferably about 79% PTFE, 12% graphite fibers, and 9% fluorinated graphite); the sintered material forms a seal between members moving relative to each other; the seal bears against a polycrystalline (e.g., ceramic) surface; and the seal is annular and has an annular endless helical tension spring embedded therein. A particularly advantageous application of the invention is as a seal for a high-pressure pump for liquid chromatography, particularly a pump of the kind described in Ser. No. 10,686 wherein a small diameter (e.g., ⅛ inch) plunger is relatively rapidly reciprocated.

In another aspect the invention features a method of making wear-resistant and chemically-inert articles, the method including the steps of mixing polytetrafluoroethylene, graphite fibers and fluorinated graphite, molding this mixture into the desired shape, and sintering the molded mixture. In preferred embodiments the sintering is carried out in a mold; the articles are sintered by placing them in an oven at a temperature of between 365° C. to 375° C. and are removed therefrom immediately upon reaching that temperature; and the articles are immediately quenched (e.g., in ice water) after removal from the oven.

PREFERRED EMBODIMENT

The structure, manufacture and use of a preferred embodiment of the invention will now be described, after first briefly describing the drawings.

BRIEF DESCRIPTION OF THE DRAWINGS

FIG. 1 is a sectional view of said embodiment, installed in a pump.

FIG. 2 is a sectional view of said embodiment prior to sintering.

STRUCTURE

Referring to FIGS. 1 and 2, there is shown self-lubricating seal 10 clamped between head 12 and mounting plate 14 of a pump for chromatography. The pump is described in copending U.S. application Ser. No. 10,686 (hereby incorporated by reference). Seal 10 has sealing bore 24, flange 16 (clamped against bushing 18), and a conventional helical endless spring 22 embedded in the pressurized end of the seal. Ceramic plunger 26 (⅛ inch diameter and lapped with diamond powder to a roughness of 10 microinches rms) is slidably mounted through bushing 18 and seal 10. The plunger travels in pumping bore 28, having inlet passage 30 and outlet passage 32 connected thereto. A thin teflon washer 34 is placed between flange 16 and head 12 to improve the seal between the head and seal 10.

MANUFACTURE

A homogeneous, fine and granular mixture suitable for molding and sintering into a wear-resistant article is first prepared. Fifty-two grams of PTFE (No. 8 granules available from DuPont) are mixed in a blender with approximately 170 ml methylene chloride at a high speed for one minute to form a slurry. Next eight grams of graphite fibers (approximately 0.04 inches long and 0.001 inches in diameter, from Union Carbide), and six grams of fluorinated graphite (approximately 40% fluorine and 60% carbon, from Air Products) are mixed with approximately 130 ml methylene chloride to form a slurry, and this second slurry is then added to the first and mixed for 1½ minutes in the blender at a high speed. The resulting slurry is then dried on filter paper inserted in a funnel attached to a vacuum source. It is important to achieve a granular mixture and avoid the formation of a cake which might result if the vacuum is applied to the mixture after removal of solvent. Thus, just as the last drops appear to be forming, the vacuum is disconnected. This drained mixture is then placed in the blender with approximately 200 ml R.O. (i.e., reverse osmosis) water, three short high speed blending pulses are applied (the motor's rotation being stopped between each pulse), and the resulting lumpy mixture is placed in a collander to allow draining of the bulk water. The mixture is then placed on aluminum foil and excess water is allowed to run off prior to drying the mixture for approximately eight hours in an oven at 125° C. The resulting dry and granular mixture is passed through #10 sieves and then through #14 sieves to break up the lumps. The sieves are agitated to promote passage of the mixture particles, but there is no mashing to avoid crushing them. This sieved material is now suitable for storage in plastic bags and/or molding and sintering.

The seal 10 is formed by pouring the sieved material into a mold, and compacting the material to the shape shown in FIG. 2, all by techniques well known in the art, such as disclosed in *Mechanical Design Data E/05561*, DuPont (1961) and *The Moulding of PTFE Granular Powders*, Technical Service Note F-1 (2nd Ed.), The Moulding Powders Group, Plastics Division, Imperial Chemical Industries, Ltd., Hartfordshire, England (June 1973), both hereby incorporated by reference.

The compacted and molded article is placed into a sintering mold of the same dimensions as the first mold, and spring 22 is placed into annular groove 20. The surface of the sintering mold corresponding to bore 24 of the seal is polished to at least 16 microinches rms to impart the same smoothness to the bore. The mold maintains the shape of bore 24 during sintering.

The sintering mold is placed into a temperature-controlled, air-circulating oven having a temperature of 370° C. The temperature of the article is monitored, and when it reaches 370° C., the article and mold are immediately taken out of the oven and quenched in ice water. The 370° C. temperature is high enough to assure that the seal reaches its sintering temperature, but not so high as to allow the seal to remain at an elevated temperature any longer than is necessary to achieve sintering, for if the seal is not removed soon after sintering, its surface will oxidize and lose wear-resistance. The fact that the empirical formula of the final product agrees with that of the starting materials indicates that no such decomposition has in fact taken place. The ice water quench is used to achieve a repeatable level of PTFE crystallinity in the seal. Slower cooling (e.g., in air) could be used if the rate of cooling is kept uniform from one batch of seals to the next.

Sintering causes the composition to flow sufficiently to fill groove 20 and thus embed spring 22.

After sintering, the seal has a density of 1.7 gm/ml (in methanol), an empirical formula of $CF_{1.28}$, and a porosity of 0.07 cc/gm.

USE

The operation of the pump in which the seal is used is described in U.S. application Ser. No. 10,686. Spring 22 helps maintain a tight fit between plunger 26 and bore 24.

The seal has been found to be inert to all substances (e.g., solvents) encountered in liquid chromatography and to have significantly greater wear resistance than conventional seals.

OTHER EMBODIMENTS

Other embodiments of the invention will occur to those skilled in the art. For example, bearings, bushings, and other types of seals could be made from the new composition. The composition has application wherever increased wear resistance is desirable. In the preferred pump application, a polished polycrystalline (e.g., ceramic) material is preferred for the plunger, because it wears uniformly around the plunger circumference, but a monocrystalline material (e.g., sapphire) will also work, though not as well. Also, the methylene chloride may be replaced by other halogenated hydrocarbons having relatively low boiling points, e.g., carbon tetrachloride and Freons.

OTHER INVENTIONS

The composition used to mold and sinter wear resistant articles is the subject matter of a commonly assigned patent application of the inventors herein entitled "Wear Resistant Composition."

What is claimed is:

1. A sintered, molded wear-resistant shaped article having a non-oxidized surface and having the empirically derived formula $CF_{1.28}$ made from a molded and sintered granular mixture consisting essentially of 74-84% by weight polytetrafluoroethylene, 7-17% by weight graphite fibers, and 4-14% by weight fluorinated graphite.

2. The article of claim 1 wherein said mixture is about 79% polytetrafluoroethylene, 12% graphite fibers, and 9% fluorinated graphite.

3. The article of claim 1 wherein said article includes a working surface that rubs against another surface moving relative thereto.

4. The article of claim 3 wherein said working surface is a sealing surface and said article has the form of an annular seal.

5. The seal of claim 4 further comprising a flanged end for clamping installation.

6. The seal of claim 4 wherein there is a bore passing therethrough and an annular spring element embedded in the seal all around said bore.

7. The seal of claim 6 wherein said spring element is an endless helical spring.

* * * * *